Nov. 29, 1932. A. F. MASURY 1,889,559
CLOSED VEHICLE FOR COLLECTING REFUSE
Filed June 10, 1930 2 Sheets-Sheet 2

INVENTOR
Alfred F. Masury,
BY
Redding, Greeley, O'Shea & Campbell
HIS ATTORNEYS

Patented Nov. 29, 1932

1,889,559

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

CLOSED VEHICLE FOR COLLECTING REFUSE

Application filed June 10, 1930. Serial No. 460,119.

The present invention relates to vehicles carrying commercial bodies and embodies, more specifically, an improved vehicle constructed to facilitate the collection and transportation of refuse.

In order that refuse, such as garbage and ashes may be readily collected and transported without the attendance of the usual obnoxious odors and dust, it is desirable that the collecting vehicle be provided with a closed body. Accordingly, certain vehicles with closed bodies are now available but the important factors to be considered in constructions of this character have received inadequate attention in many respects. For example, it is highly desirable to provide a fluid tight body of maximum capacity, the body being readily transportable and being mounted in such manner that it may be conveniently dumped when the occasion arises. It is furthermore desirable that the body be closed and that a suitable form of ventilating mechanism be provided to carry away and destroy the obnoxious odors and dust which may be present within the body.

In order that the above features may be incorporated in a suitable construction and that the flexibility of the drive and manœuvreability of the vehicle may be preserved, an improved form of suspension is provided for the body of the vehicle.

An object of the invention, accordingly, is to provide an improved fluid tight body having maximum capacity and provided with a suitable elevating mechanism.

A further object of the invention is to provide a body of the above character which is readily dumped.

A further object of the invention is to provide a spring suspension and wheel mounting for a body of the above character by means of which the body may be mounted with minimum clearance above the road surface and with a relatively high dumping pivot to enable the contents of the body to be discharged in a manner to be described hereinafter.

Further objects, not specifically enumerated above, will be apparent as the invention is described in greater detail in connection with the accompanying drawings, wherein.

Figure 1:
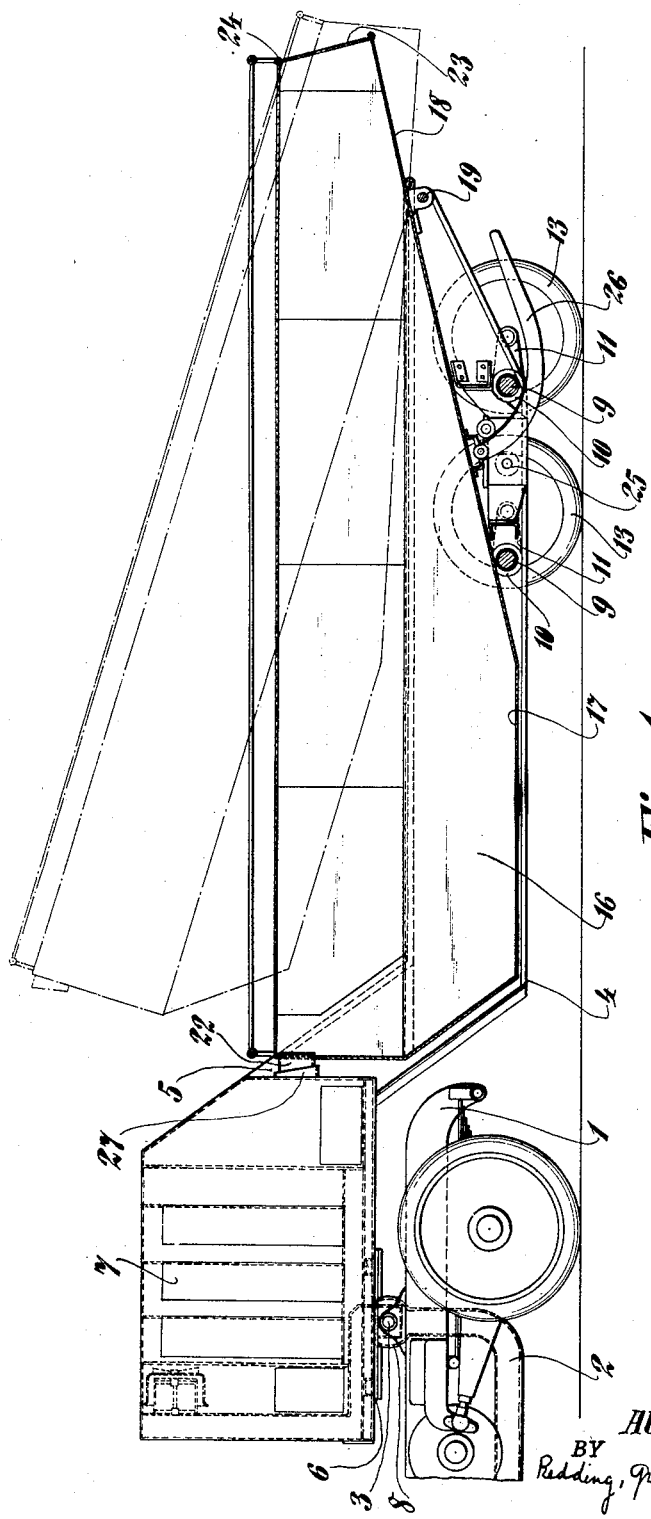
Figure 1 is a view in side elevation, showing a vehicle constructed in accordance with the present invention.
Figure 2:
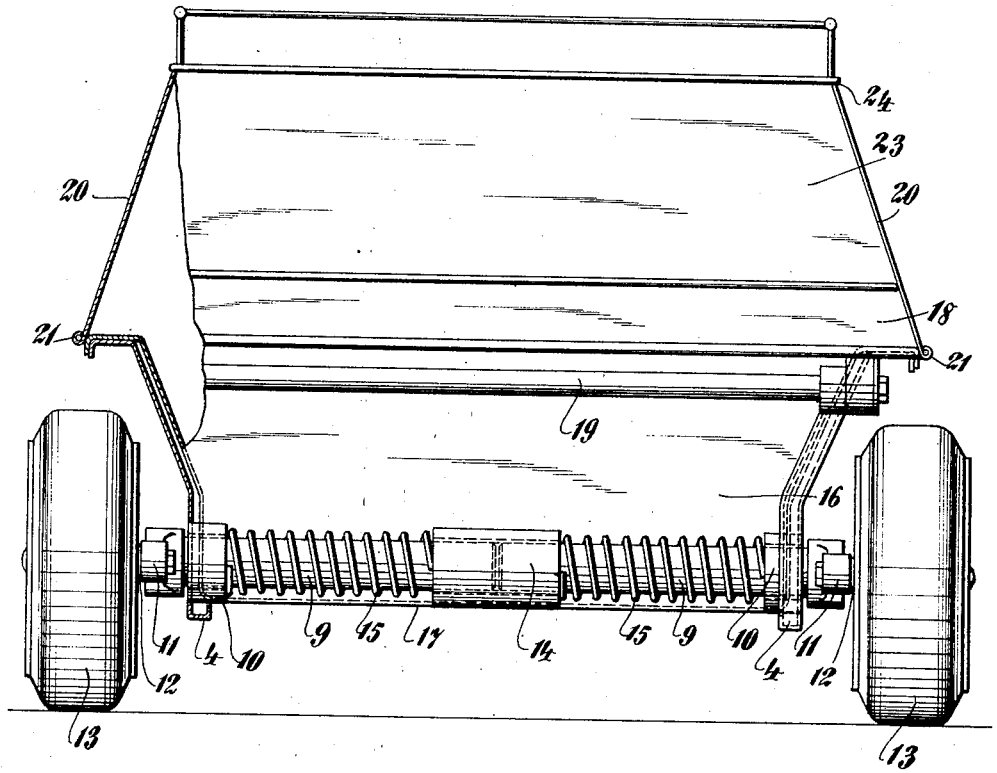
Figure 2 is a view in end elevation, showing the vehicle of Figure 1.
Figure 3:
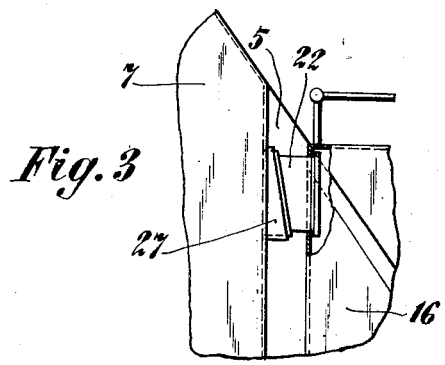
Figure 3 is a detail view showing the elevating connection between the dump body and the trailer frame.

Referring to the above drawings a suitable tractor is shown at 1 having a conduit 2 and fifth wheel 3. A trailer frame 4 is formed with an upwardly and forwardly extending portion 5 upon which the cooperating element 6 of fifth wheel member 3 is carried, a suitable air cleaner 7 being carried upon the forward portion of the frame 4. Conduit 2 extends through the axis of the fifth wheel and, by means of a suitable ball joint 8 communicates with the cleaner 7. Inlet 27 is provided on the rear extremity of the cleaner 7 and is adapted to cooperate with a suitable coupling member to be described hereinafter.

In order that the frame 4 may be effectively supported, a plurality of dead axles 9 are mounted thereon, rearwardly thereof, suitable bearings 10 being provided to journal the axles in the frame members 4. Arms 11 on the outer extremities of the axles 9 are formed with stub axles 12, upon which wheels 13 are mounted, the specific construction of this portion of the wheel mounting forming no part of the present invention.

Secured to the stationary portion of the frame 4, are sleeves 14, the ends of dead axles 9 being received within these sleeves and journaled therein. Oppositely extending helical springs 15 are secured at the adjacent ends thereof in the respective sleeves 14, while the opposite ends of such springs are secured to the dead axles 9. In this manner, the movements of the arms 11 with respect to the frame 4 are effectively cushioned.

In order that the collection and transportation of refuse may be facilitated, a body 16 is provided for the frame 4, the bottom portion 17 thereof being fluid tight and the sides thereof sloping downwardly to enable the body to be nested within the frame 4.

A rearwardly sloping portion 18 of the body is hinged at 19 upon the extreme rearward portion of the frame 4 to permit the body to be dumped as indicated in dot and dash lines in Figure 1. Suitable panels 20 are provided for the upper portion of the body, these panels preferably being hinged at 21 and sloping inwardly and upwardly to facilitate the loading of the body. In this manner, the body is closed and the forward extremity thereof is formed with a connection 22 which cooperates with the connection 27 on the cleaner. Communication is thus established between the cleaner 7 and the interior of the body 16 to afford effective ventilation on the latter. When the body is moved to a dumping position, the tapered portions of the connections 27 and 22 permit such movement freely. A tail gate 23 is mounted at the extreme rearward end of the body and is hinged at 24, thus facilitating the unloading of the body.

A dumping mechanism 25, of a well known form, may be provided, the frame shown herein being of a mechanical type acting upon a curved rack 26 which is carried by the body 16. By reason of the extreme overhang of the end of the body, the vehicle may be backed to any desired position and the contents thus discharged at locations varying considerably in character. For instance, where the contents of the body are to be discharged into a barge which is secured to the side of a pier, the extreme overhang of the body permits the barge to be evenly loaded since the contents may be discharged adjacent the outer side of the barge, as well as adjacent the side of the barge next to the pier.

The spring suspension and mounting of the body described herein renders the same highly flexible and greatly increases the manoeuvreability thereof.

While the invention has been described with specific reference to the accompanying drawings, it is not to be limited, save as defined in the appended claim.

I claim as my invention:

A trailer frame having side members, aligned shafts, arms on the opposite ends of the shafts, wheels journaled on the arms, journal bearings for the shafts secured to the frame adjacent the arms, a sleeve on the frame in the central section thereof to journal the shafts independently at the adjacent ends thereof, and coil springs about the respective shafts secured to the shaft and one of the bearings and between the first bearings and the sleeve to cushion relative movement between the shafts and frame.

This specification signed this 7 day of June A. D. 1930.

ALFRED F. MASURY.